United States Patent
Wagner et al.

(10) Patent No.: US 7,188,889 B2
(45) Date of Patent: Mar. 13, 2007

(54) RETRACTABLE CLEANABLE COVER FOR SLIDE-OUT UNIT

(75) Inventors: Robert Wagner, Longmont, CO (US); Scott W. Thompson, Longmont, CO (US)

(73) Assignee: Garefree/Scott Fetzer Company, Broomfield, CO (US)

( * ) Notice: Subject to any disclaimer, the term of this patent is extended or adjusted under 35 U.S.C. 154(b) by 189 days.

(21) Appl. No.: 10/993,038

(22) Filed: Nov. 19, 2004

(65) Prior Publication Data

US 2006/0108819 A1    May 25, 2006

(51) Int. Cl.
*B60P 3/34* (2006.01)

(52) U.S. Cl. .................. 296/163; 296/165; 296/171; 296/175; 160/66; 135/88.11; 135/88.12

(58) Field of Classification Search ............... 296/163, 296/165, 171–172, 175–176; 160/66, 23.1; 135/88.01, 88.05, 88.1, 88.12, 88.11
See application file for complete search history.

(56) References Cited

U.S. PATENT DOCUMENTS

| 5,860,440 | A | 1/1999 | Murray et al. |
| RE37,567 | E | 3/2002 | Murray |
| 7,017,976 | B1 | 3/2006 | Rutherford et al. |
| 2002/0092552 | A1* | 7/2002 | Jones |

* cited by examiner

*Primary Examiner*—Stephen Gordon
(74) *Attorney, Agent, or Firm*—Dorsey & Whitney LLP

(57) ABSTRACT

A retractable cover for a slide-out unit on a recreational vehicle, mobile home, travel trailer, or the like, includes a roll bar that is movable with the slide-out unit away from the side of the vehicle with the roll bar mounted in a housing having a closure plate which is easily pivoted to an open position or removed to facilitate maintenance or removal of debris that may accumulate in the housing during a retraction of the cover. The housing is mounted on the slide-out unit with brackets permitting the brackets to be located at any position along the length of the housing and also permitting the housing to assume a length that is much greater than the width of the slide-out unit providing a better cover for the slide-out unit during inclement weather.

5 Claims, 12 Drawing Sheets

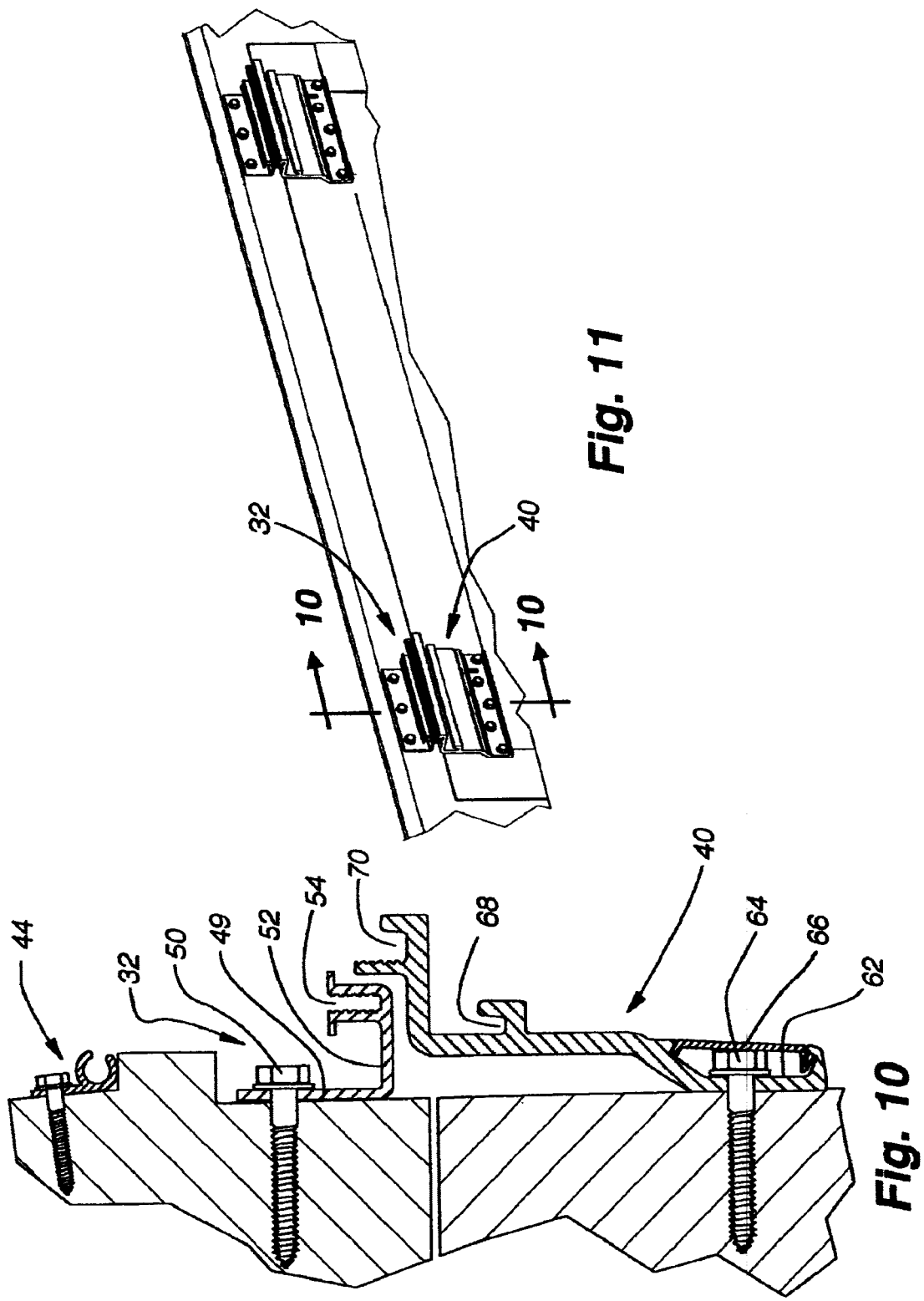

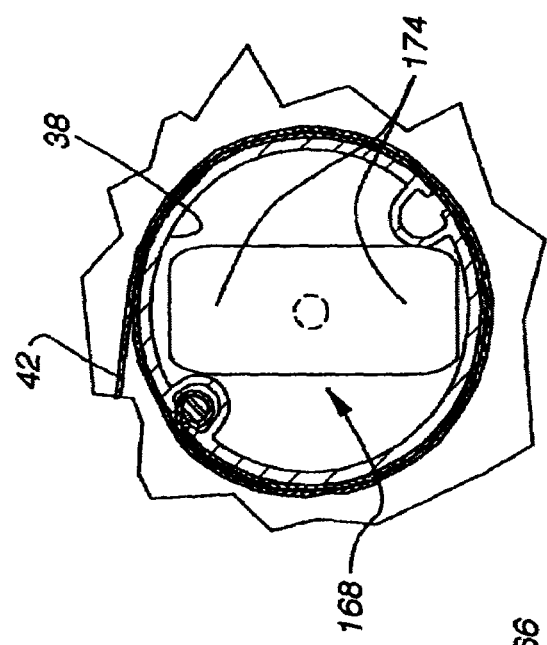
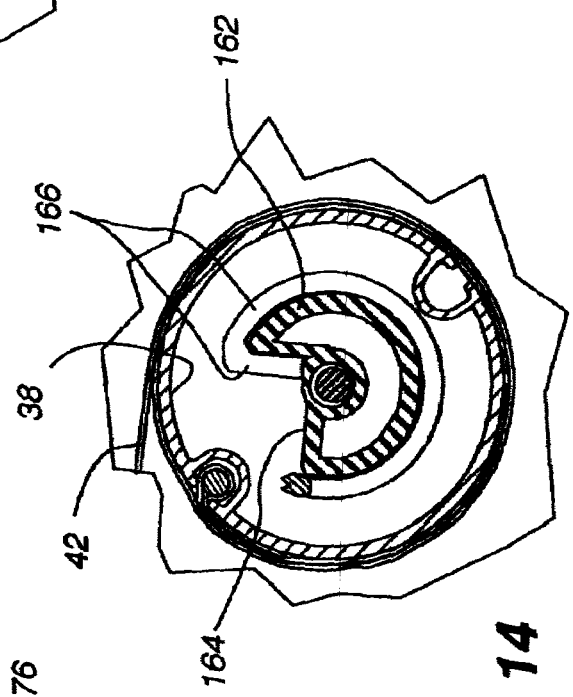
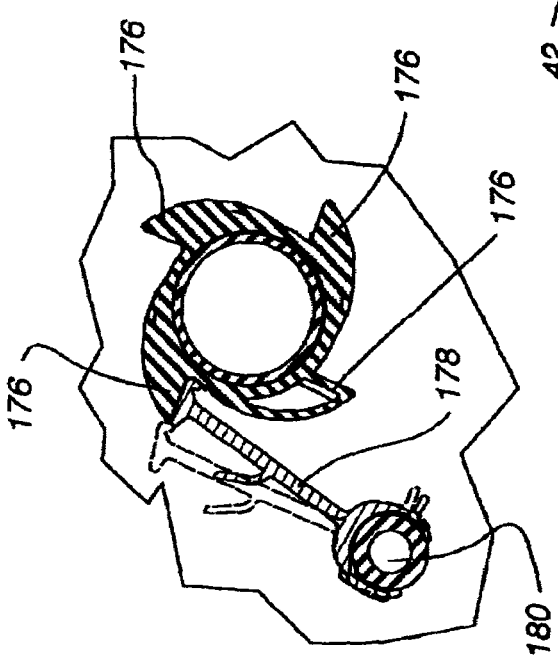
Fig. 13
Fig. 14
Fig. 15

RETRACTABLE CLEANABLE COVER FOR SLIDE-OUT UNIT

BACKGROUND OF THE INVENTION

1. Field of the Invention

A cover for a slide-out unit found on recreational vehicles, mobile homes, and the like, includes a canopy and scissors-type support arms which extend as the slide-out unit is extended from the main body of the vehicle. The scissors arms are mounted at a bias so that a support bar across the underside of the canopy is raised as the awning cover is extended and lowered as the awning cover is retracted with the slide-out unit. One edge of the canopy is secured to the side of the vehicle while the other edge is secured to a roll bar mounted in a housing secured to the slide-out unit so that the roll bar is moved away from the vehicle as the cover is extended and retracted toward the side of the vehicle as the cover is retracted. The housing includes a pivotal and removable closure plate providing easy access to the roller for maintenance and for the removal of debris that accumulates on the canopy and is captured in the housing when the cover is retracted.

2. Description of the Relevant Art

Mobile homes have been a mainstay for housing for many years and in more recent years motor home type structures have been used and are commonly referred to recreational vehicles. Similarly, trailers incorporating features of a recreational vehicle are becoming more popular and in each instance, it has become desirable to have the main body of the mobile home, recreational vehicle, trailer, or the like, expandable to selectively enlarge the living space within the vehicle. In order to accommodate such enlargement, mobile homes, recreational vehicles, trailers, and the like, are now sometimes provided with a slide-out unit which is a box-like structure having top and bottom walls as well as side walls and an outer wall with the box-like structure being motor driven between a retracted position within the interior of the vehicle and an extended position away from one side of the vehicle.

A common problem encountered with slide-out units resides in the fact that debris, such as leaves, dust, dirt, or the like, will accumulate on the top wall of the slide-out unit when the unit is extended. When the unit is subsequently retracted, the debris is brought into the interior of the vehicle. To avoid debris being brought into the vehicle during a retraction of a slide-out unit, covers have been provided over the top of the unit which extend with the slide-out unit and also retract with the unit. Any debris accumulating on the cover is therefore discarded as the unit retracts and the cover is rolled into a housing typically provided on the side of the vehicle.

An example of an extendible cover for slide-out units is found in U.S. Pat. No. RE37,567, which is of common ownership with the present application, and while the system disclosed in this patent overcomes some problems that were previously prevalent with the use of slide-out units, the solutions have not been entirely satisfactory as the cover is flat when extended and generally coextensive with the top of the slide-out unit so that debris, rain, and the like will accumulate on the cover. An improvement is found in copending application Ser. No. 10/964,840 filed Oct. 13, 2004 entitled Awning Cover for Slide-Out Unit for Recreational Vehicles, which is also of common ownership with the present application. In the cover disclosed in that application, the canopy component of the cover is raised at an intermediate location as the cover is extended so as to form a gable-like configuration encouraging debris and the like to be automatically discarded from the cover.

All debris is not discarded during retraction of the awning even in an awning of the type described and disclosed in application Ser. No. 10/964,840, and, accordingly, it would be desirable to provide a system whereby such debris could be more effectively prevented from being brought into the interior of the vehicle upon retraction of the awning.

It is to provide improvements in awning covers for slide-out units solving the problems raised above that the present invention has been developed.

BRIEF SUMMARY OF THE INVENTION

A cover for a slide-out unit on a mobile home, recreational vehicle, travel trailer, or the like, includes a canopy having one edge secured to the side of the vehicle and the other edge to a roll bar mounted to the outer wall of the slide-out unit. The canopy is adapted to be wrapped about the roll bar when the slide-out unit and the cover are moved into a retracted position and unwrapped from the roll bar when extended.

The roll bar is mounted in an aesthetically attractive housing and a support system, which may be of the type described in the afore-noted U.S. patent application Ser. No. 10/964,840, supports the canopy in a gabled configuration between the side of the vehicle and the outer wall of the slide-out unit where the roll bar is mounted.

The housing for the roll bar has a mounting bar extending along its length with the mounting bar being at least as wide as the slide-out unit but can extend any distance beyond the side walls of the slide-out unit to accommodate larger canopies if desired. The mounting bar is designed to be connectible to any number of mounting brackets on the outer wall of the slide-out unit depending upon the length of the cover and the width of the slide-out unit.

End caps are secured to the ends of the mounting bar and rotatably support the roll bar, which is spring-biased and in which the outer edge of the canopy is secured in a conventional manner. At least one intermediate support member may be removably connected to the mounting bar at any desired location along the length of the mounting bar to prevent sagging of the roll bar particularly on relatively long roll bars and wide slide-out units. The intermediate support member has rollers adapted to engage the canopy as it is wrapped around the roll bar to prevent sagging of the roll bar and therefore assure a smooth deployment and retraction of the canopy.

The housing has a closure plate or panel pivotally and removably connected to the end caps to conceal the roll bar during normal operation. The closure plate can be pivoted open or completely removed from the remainder of the housing to expose the roll bar for maintenance purposes or to remove debris that may accumulate within the housing as the cover is retracted and the canopy is wrapped around the roll bar. In other words, while the canopy is preferably mounted in a gable configured manner as described in the afore-noted U.S. patent application Ser. No. 10/964,840 so that debris is encouraged to naturally slide off the canopy, any remaining debris will drop off the canopy as it wraps around the roll bar so that such debris can be captured within the housing and removed therefrom by pivotally opening or removing the closure plate.

Other aspects, features, and details of the present invention can be more completely understood by reference to the following detailed description of the preferred embodiment, taken in conjunction with the drawings and from the appended claims.

BRIEF DESCRIPTION OF THE DRAWINGS

FIG. 10 is an enlarged fragmentary section taken along line 10—10 of FIG. 11.

FIG. 11 is a fragmentary isometric looking at the top edge of the slide-out unit along its juncture with the side of the recreational vehicle illustrating the mounting brackets on the vehicle and the slide-out unit.

FIG. 13 is a fragmentary section taken along line 13—13 of FIG. 12.

FIG. 14 is a fragmentary section taken along line 14—14 of FIG. 12.

FIG. 15 is a fragmentary section taken along line 15—15 of FIG. 12.

DETAILED DESCRIPTION OF THE INVENTION

Figure 1:
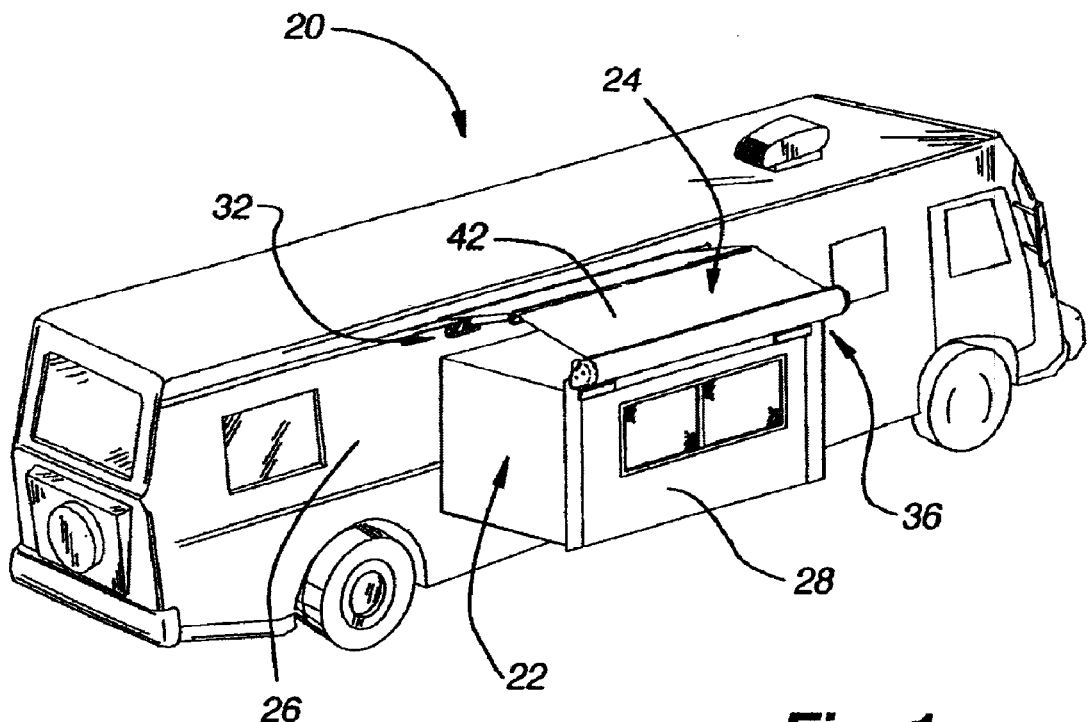
FIG. 1 is an isometric of a recreational vehicle having an extended slide-out unit incorporating the cover of the present invention.
Figure 2:
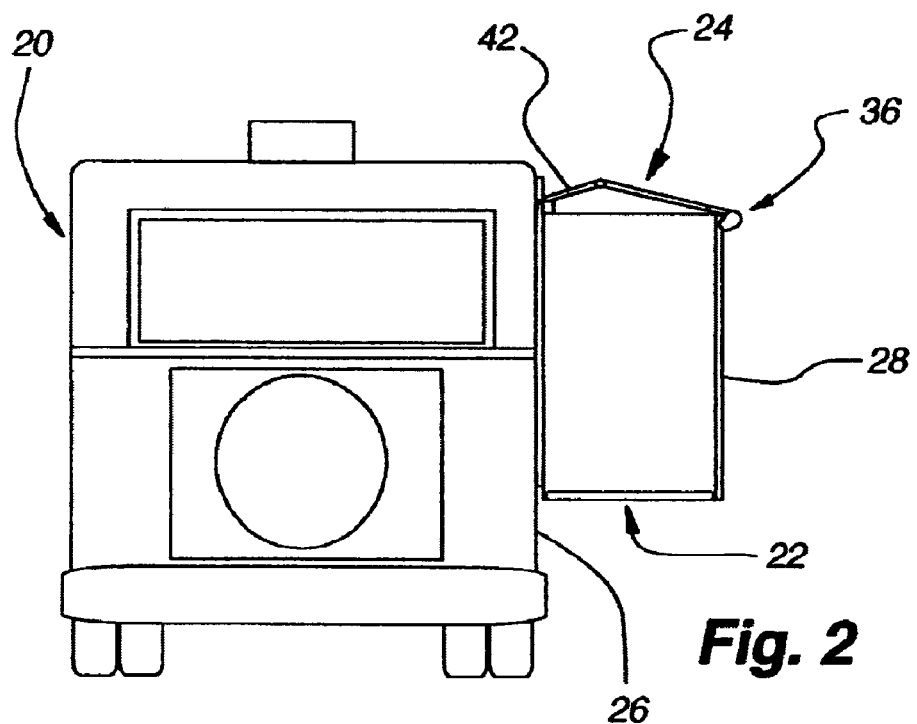
FIG. 2 is a rear elevation of the recreational vehicle as shown in FIG. 1.
Figure 4:
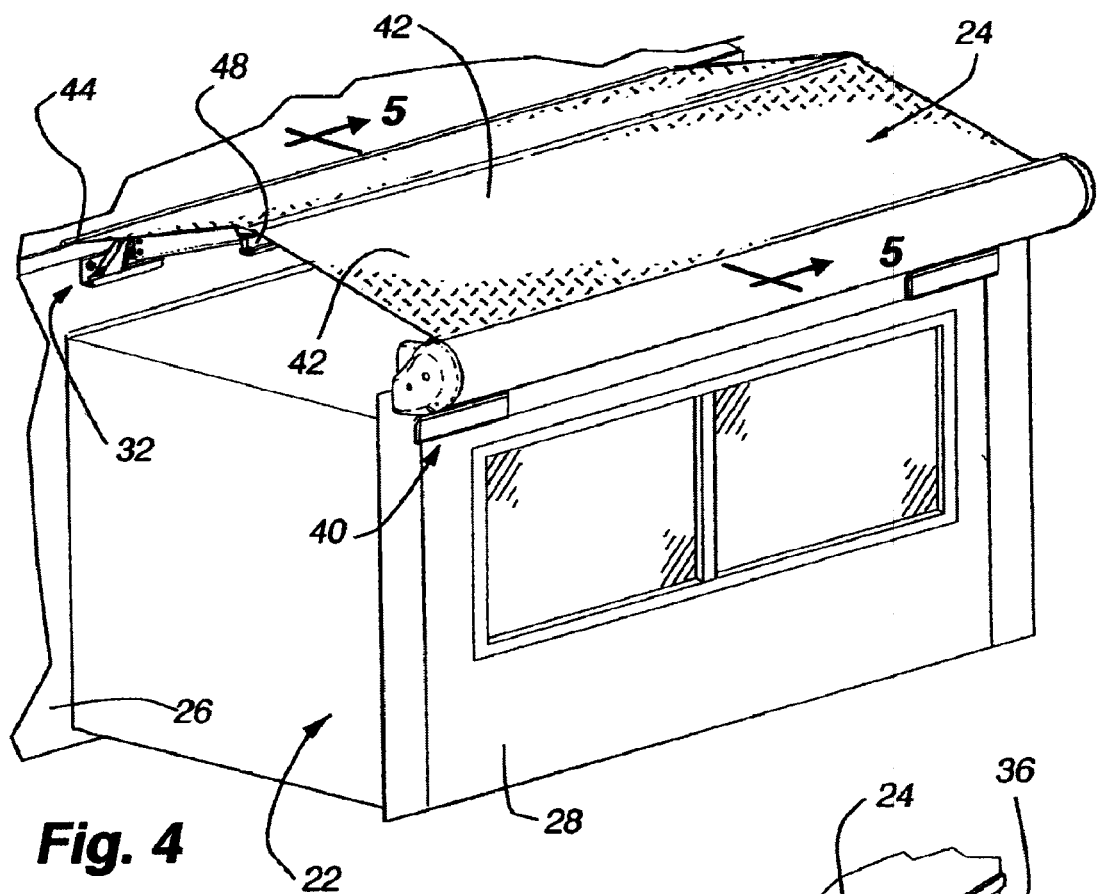
FIG. 4 is an enlarged fragmentary isometric similar to FIG. 3 with the slide-out unit and cover in an extended position.
Figure 3:
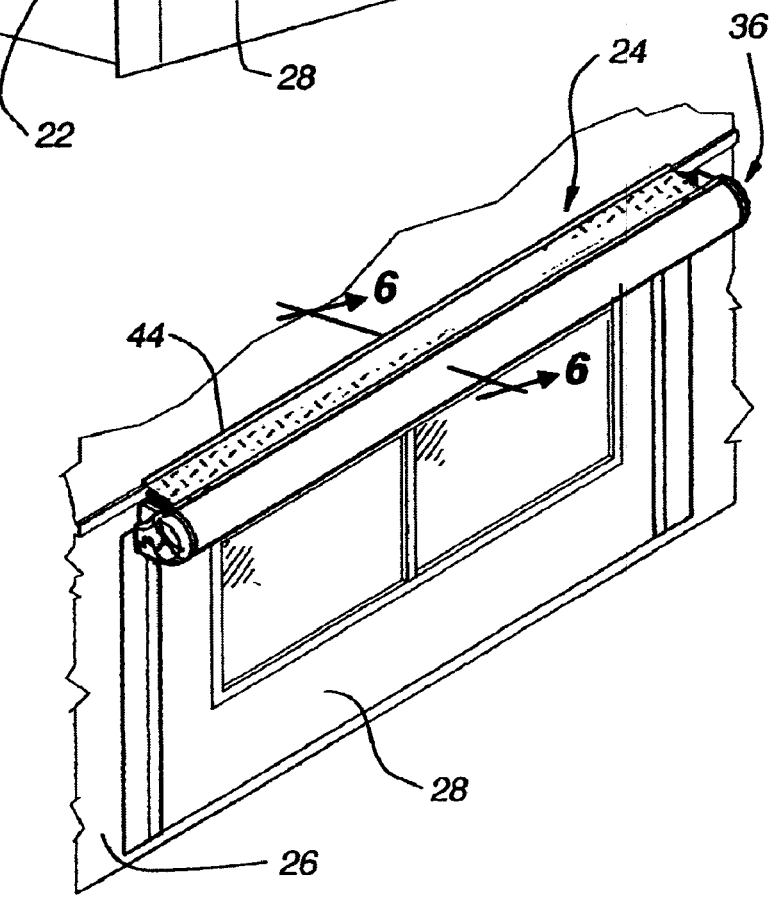
FIG. 3 is an enlarged fragmentary isometric showing the slide-out unit along with the cover of the present invention in a retracted position.

Referring to FIGS. 1 and 2, a recreational vehicle 20 having a slide-out unit 22 in an extended position is shown with the retractable cover 24 of the present invention interconnecting a side wall 26 of the vehicle with an outer wall 28 of the slide-out unit. In FIGS. 3 and 4, the slide-out unit is shown retracted and extended, respectively, with the cover of the present invention shown retracted and extended accordingly.

Figure 5:
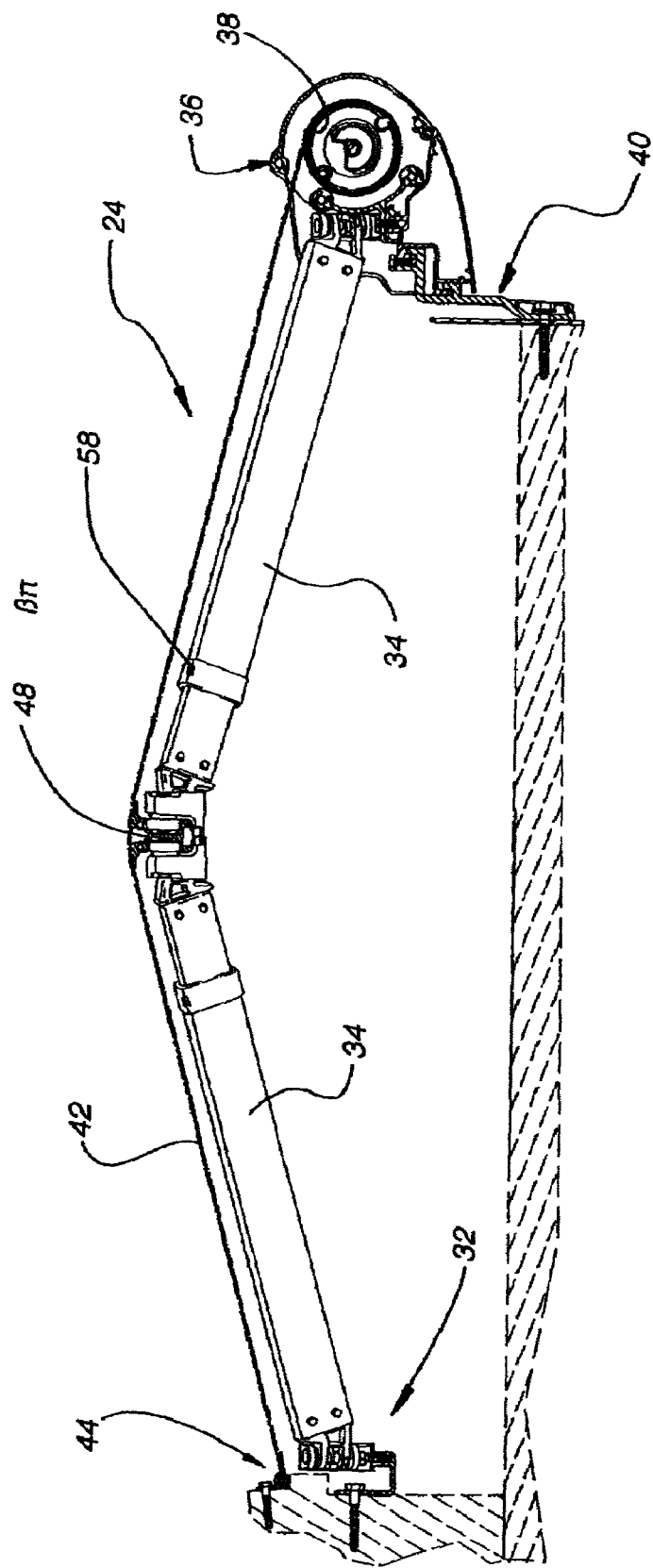
FIG. 5 is a further enlarged fragmentary section taken along line 5—5 of FIG. 4.

As best seen in FIGS. 3–5, the retractable cover can be seen to include a support system 30 anchored with mounting brackets 32 to the side wall 26 of the recreational vehicle immediately above the opening in the side wall of the vehicle in which the slide-out unit is disposed. The support system includes pivotally interconnected support arms 34 which extend and retract in a scissors-type manner when the cover is extended and retracted respectively. Along the outer edge of the support system, a housing 36 for a roll bar 38 is provided with the housing being connected to the outer edge of the support system and to support brackets 40 on the outer wall 28 of the slide-out unit 22 adjacent the upper edge thereof. The roll bar is rotatably disposed within the housing and is anchored in a conventional manner to an outer edge of a flexible canopy 42 whose inner edge is anchored with a mounting rail 44 to the side wall of the vehicle immediately above the side wall mounting brackets 32. As will be explained hereafter, the roll bar is spring biased toward a retracted position wherein the canopy is wrapped therearound with the biasing being in a clockwise direction as viewed in FIG. 5. Accordingly, when the cover 24 is moved from the extended position of FIG. 5 to the retracted position of FIG. 3, the canopy automatically wraps about the roll bar with the roll bar being drawn toward the side of the vehicle as the slide-out unit is retracted into the vehicle and as the scissors-type support arms collapse. The scissors-type support system could be of the type disclosed in detail in copending U.S. application Ser. No. 10/964,840 filed Oct. 13, 2004, which is of common ownership with the present application and which is hereby incorporated by reference herein.

It will be appreciated that the support system 30 is uniquely designed so that when fully retracted, as shown in FIG. 3, the support arms 34 in the support system are folded in compact adjacent side-by-side relationship next to the side wall 26 of the recreational vehicle but as the slide-out unit is extended along with the housing 36 and its enclosed roll bar, the support system is extended and due to an angulated mounting of the support arms to brackets 46 at the distal ends of the support arms, a support beam 48 at the center of the support arms is elevated so as to create a gabled configuration for the canopy over the top of the slide-out unit. The gabled configuration encourages debris in the form of leaves, dust, rain, and the like, to naturally run or fall off the canopy so that when the slide-out unit is retracted the debris is kept off the top of the slide-out unit and is thereby prevented from being drawn into the recreational vehicle. As will be explained hereafter, to the extent any debris does not naturally run off the canopy in its extended position, the debris will accumulate within the housing 36 for the roll bar 38 as the canopy is wrapped around the roll bar and can be removed from the housing in a convenient manner.

The inner edge of the canopy 42 is secured to the side wall 26 of the recreational vehicle with the mounting rail 44 which is an elongated continuous rail having a groove of C-shaped cross section adapted to conventionally receive a hem in the inner edge of the canopy with a retaining rod therein. As possibly best seen in FIGS. 7, 9, 10, and 11, the scissors support arms 34 for the support system 30 are mounted on a pair of the mounting brackets 32 with the inner end of an inner arm in the support system being mounted on a pivot bracket 46 which in turn is secured to an associated mounting bracket 32 on the side wall of the vehicle.

Figure 6:
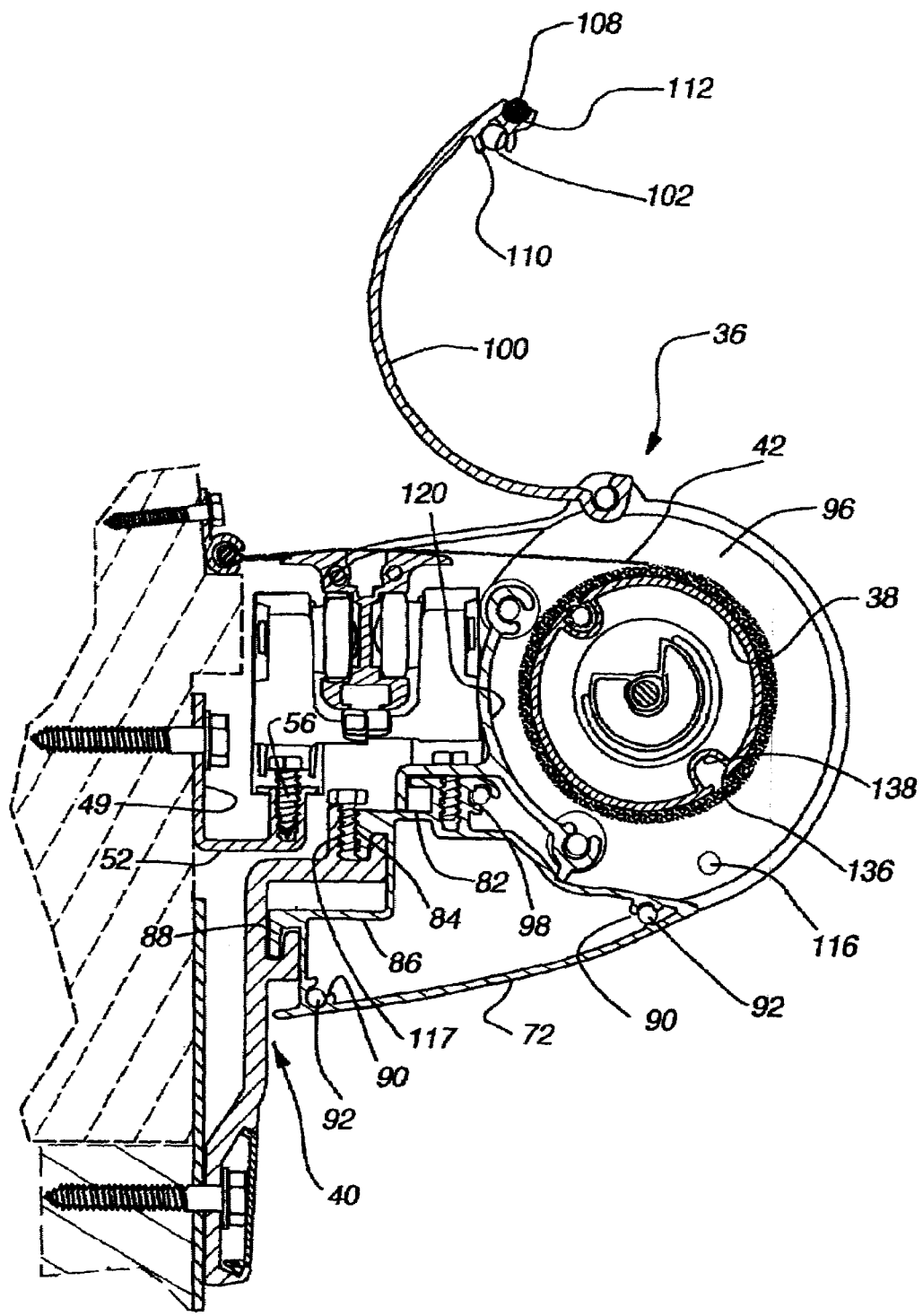
FIG. 6 is a further enlarged fragmentary section taken along line 6—6 of FIG. 3.
Figure 7:
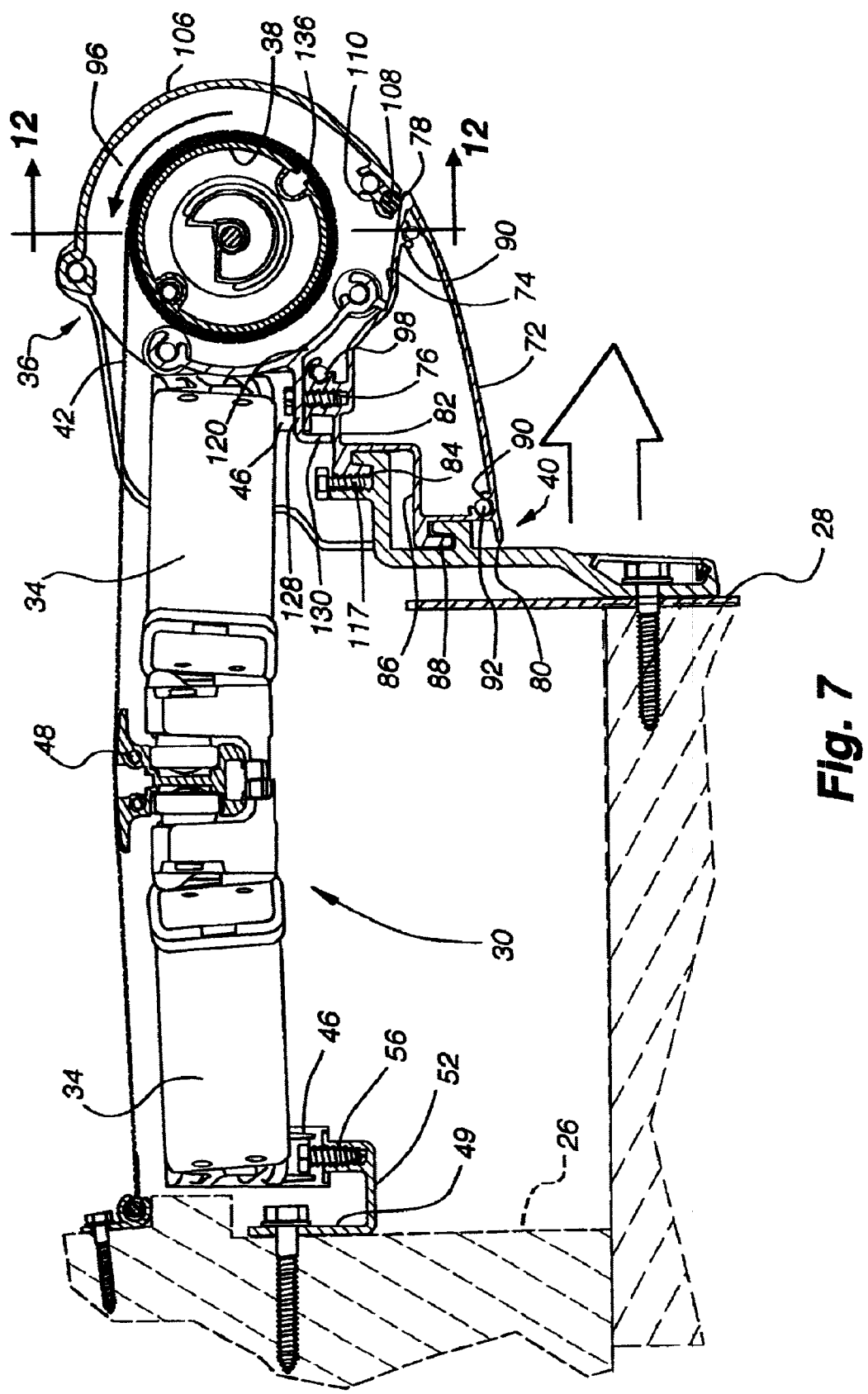
FIG. 7 is a section similar to FIG. 6 with the cover partially extended and with the cover plate in a closed position.
Figure 8:
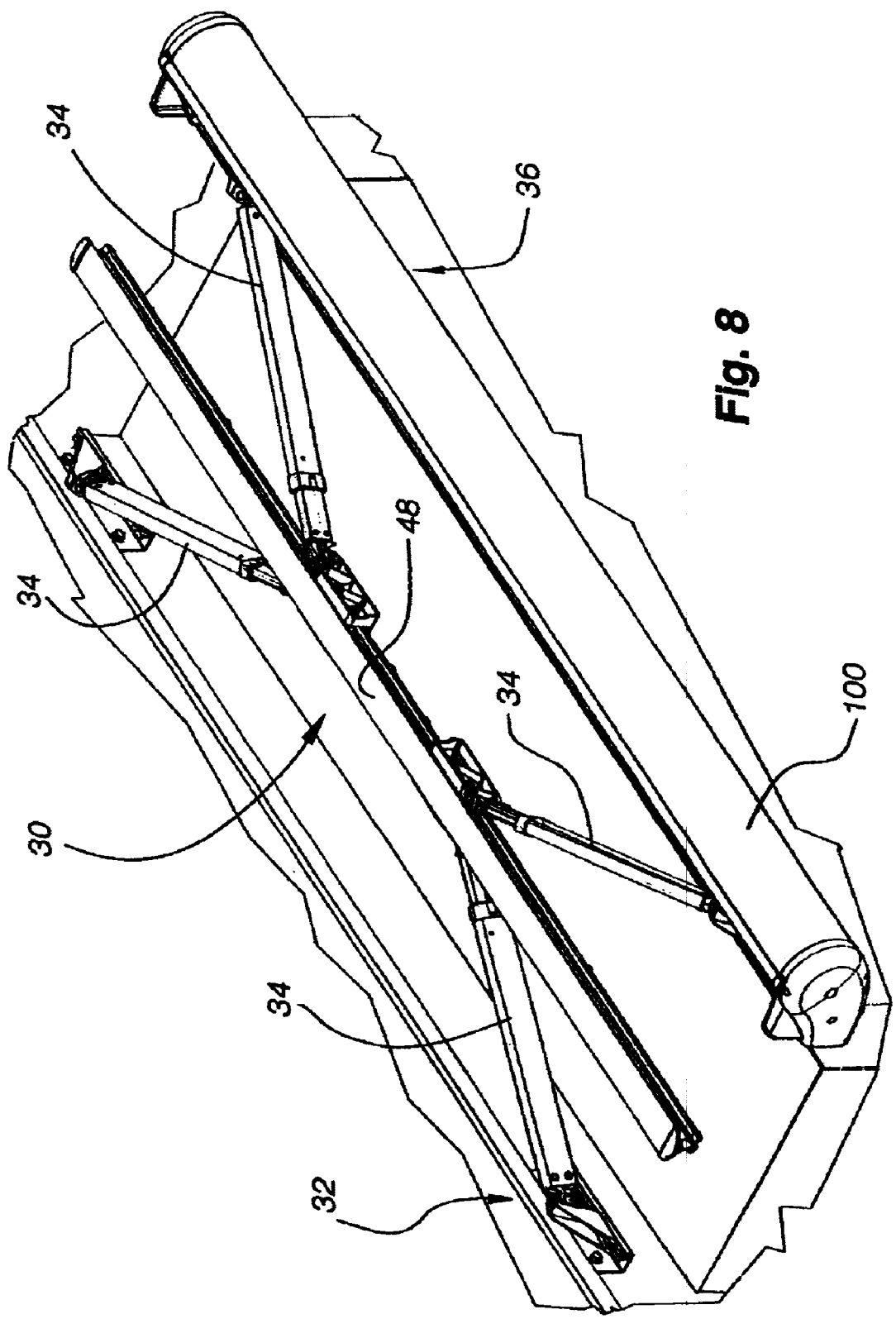
FIG. 8 is an isometric looking downwardly on the partially extended cover as shown in FIG. 7 with the canopy removed to show the support system for the cover.
Figure 9:
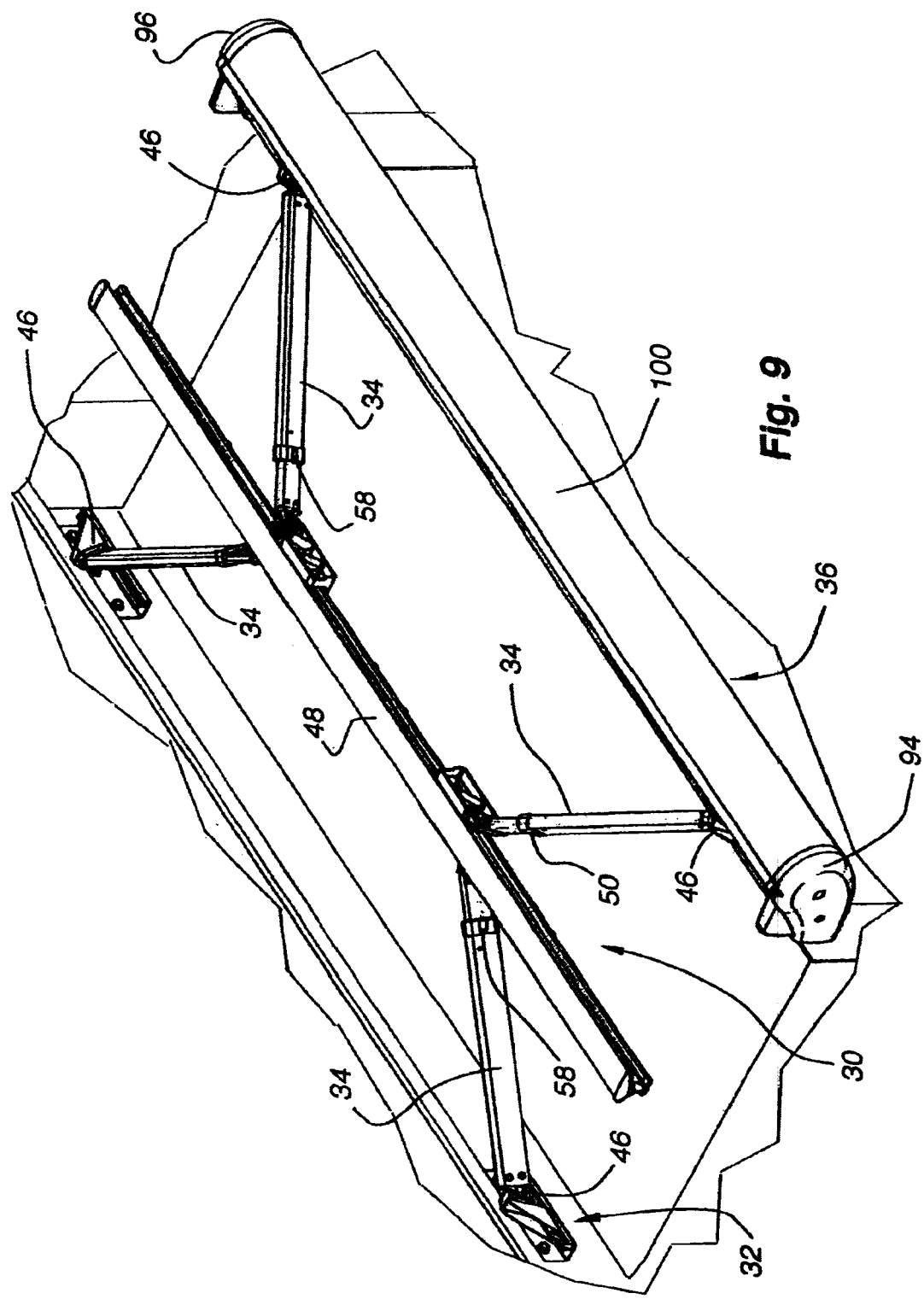
FIG. 9 is an isometric similar to FIG. 8 with the cover further extended.

Each mounting bracket 32 as best seen in FIGS. 6, 7 and 10 has a vertical flange 49 securable to the side wall 26 of the vehicle with a suitable fastener 50 and a lower out turned arm 52 having an upwardly opening ridged groove 54 so that a fastener 56 as best shown in FIG. 7 can be passed through the pivot bracket 46 of the support system and into the upwardly opening groove to secure the pivot bracket to the mounting bracket 46. It should also be appreciated in the support system, that each of the scissors arms 34 is distinguishable from those utilized in the afore-mentioned U.S. application Ser. No. 10/964,840, which has been incorporated by reference in that the arms in the present disclosure are made to be telescoping and can be fixed at any predetermined length with set screws 58 so that one adjustable support system 30 can be used to accommodate various sized covers 24. In other words, each scissors arm remains of a fixed length once the size of the cover has been determined but due to the adjustable length of the scissors arm, they can be used in various sized covers.

The housing 36 for the roll bar 38 is mounted on the outer wall 28 of the slide-out unit with two or more of the support brackets 40 best seen in FIGS. 6, 7 and 10, the number of which would depend on the length of the housing and thus the support felt necessary for the housing. In the disclosed embodiment, there are two such support brackets shown with one bracket being near one side edge of the outer wall 28 and the other near the opposite side edge. The support brackets are identical and are extruded into a fairly short length that may be for example six inches to a foot in length. Each bracket has a recess 62 near its lower edge with an opening therethrough to receive fasteners 64 that secure the bracket to the outer wall of the slide-out unit. A decorative cover strip 66, as seen in FIG. 7, may be snapped into the recess to cover the fasteners for aesthetic purposes. The bracket 40 extends upwardly in spaced relationship from the outer wall 28 of the slide-out unit and has a lower upwardly opening channel 68 formed on its outer face. Above the lower opening channel, the bracket has a horizontal leg with an upper upwardly opening channel 70 adjacent to its outer edge. The lower 68 and upper 70 channels are used to hang and secure the housing 36 to the bracket as will be described later.

The housing 36, which is probably best seen in FIGS. 6, 7, 16A and 16B, has an extruded base rail 72 of a length substantially the same as the width of the canopy. It is to be appreciated the length of the base rail and the width of the canopy can be much greater than the width of the slide-out unit if desired so that the canopy 42 can extend beyond the sides of the slide-out unit to prevent rain water from blowing beneath the canopy onto the top of the slide-out unit.

Figure 16A:
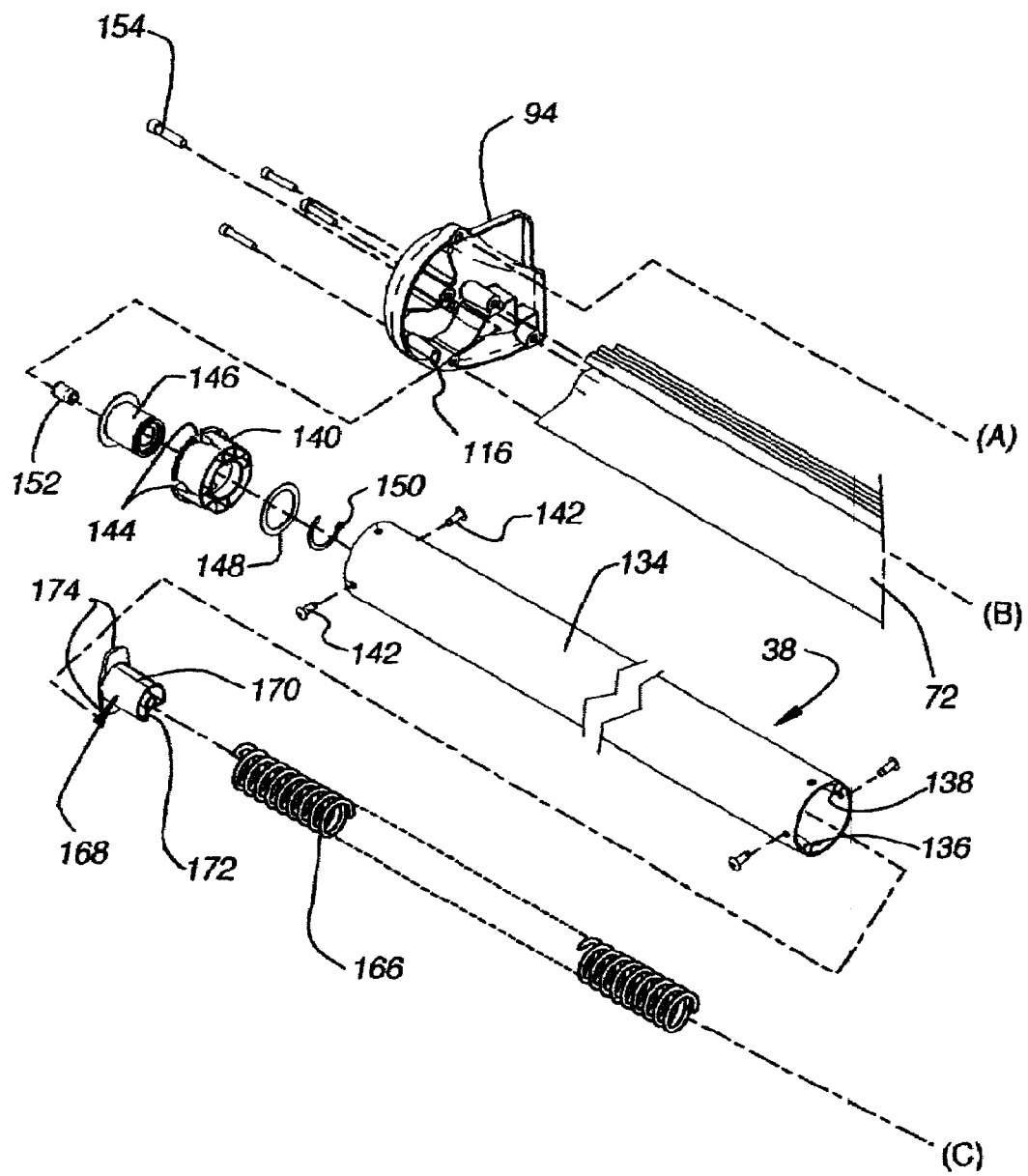
FIG. 16A is an exploded isometric showing the left end of the roll bar and its housing.

The extruded base rail 72 can be seen to be of generally triangular tubular cross section having a somewhat arcuate upwardly concave top wall 74 along its forward edge and an upwardly opening groove 76 extending along its length approximately midway between a front edge 78 and rear edge 80. Immediately behind the upwardly opening groove 76, there is an upper horizontal shelf 82 with a downturned lip 84 adapted to be seated in the upper channel 70 of a support bracket 40. Immediately beneath the upper shelf there is a lower rearwardly projecting shelf 86 having a downturned lip 88 adapted to be received in the lower channel 68 of a support bracket 40. A pair of C-shaped, inwardly opening grooves 90 (FIGS. 6 and 7) are formed in the interior of the extruded base rail along the front edge 78 and along the rear lower edge 80 with the C-shaped grooves opening through opposite ends of the extruded base rail. The C-shaped grooves are adapted to receive fasteners 92 to secure end caps 94 and 96 to opposite ends of the extruded base rail 72 as possibly best seen in FIGS. 16A and 16B. A third C-shaped groove 98 is provided along the length of the base rail on the front of the upwardly opening groove 76. The third groove is also open at opposite ends of the base rail to again receive a fastener 92 for securing the end caps to the base rail (FIGS. 16A and 16B).

Figure 16B:
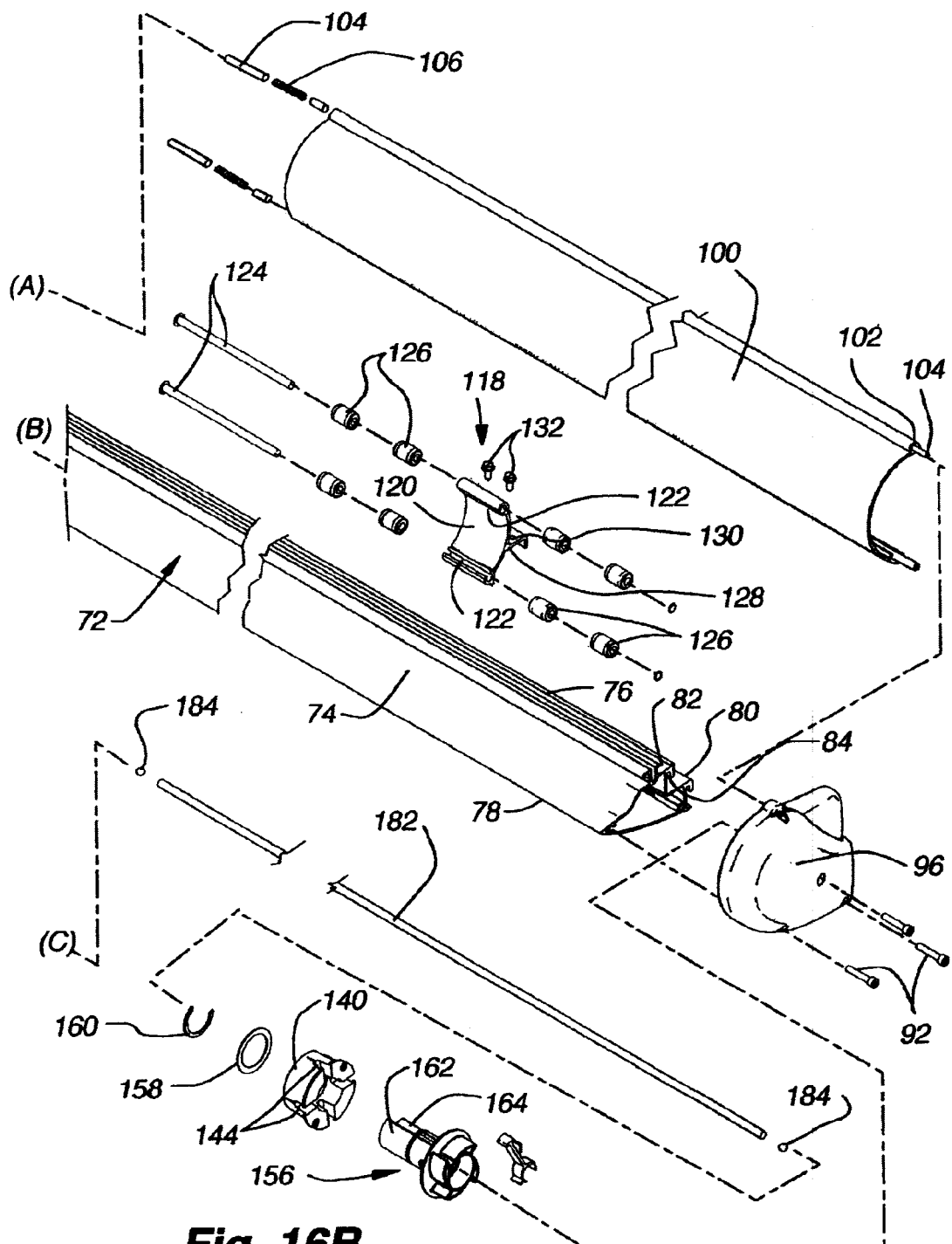
FIG. 16B is an exploded isometric similar to FIG. 16A showing the right end of the housing for the roll bar.

A closure plate or panel 100 as possibly best seen in FIG. 16B is arcuate in cross-section so as to be outwardly convex when mounted on the end caps 94 and 96. The top edge of the closure plate has an inwardly projecting groove 102 of C-shaped cross section which opens through opposite ends of the closure plate. Each open end of the groove 102 receives a depressible pin 104 mounted on a compression spring 106. The pins are removably receivable in the groove 98 at the top of the end caps 94 and 96 so that the closure plate can pivot about the pins relative to the end caps. Depression of at best one of the pins facilitates removal of the closure plate from the end caps.

The closure plate 100 as best seen in FIGS. 6 and 7 has a pair of grooves 108 and 102 of C-shaped cross-section along its lower edge. One of the grooves 108 receives a rubber rod 112 that engages the front edge 78 of the base rail 72 when the closure plate is closed as shown in FIG. 7 and the other groove 102 receives depressible pins 114 as along the upper edge of the closure plate. The depressible pins are removably positionable in aligned holes 116 in the end caps. The pins are depressed either to allow the closure plate to pivot about the pins or to permit removal of the closure plate from the remainder of the housing.

The extruded base rail 72 is probably best seen in FIG. 7 hung on the support brackets 40 by positioning the downturned lips 84 and 88 on the extruded base rail into the upper 70 and lower 68 channels of the support brackets and then positively securing the base rail in place by advancing friction screws 117 into a space between the upper downturned lip 84 and a side wall of the upper channel 70 in the support brackets. It will be appreciated that the support brackets can be short relative to the length of the housing for aesthetics and cost savings. Further, the support brackets can be placed at any desired location along the length of the housing and any number of brackets can be used.

Before describing in detail the roll bar 38 which is rotationally mounted on the opposed end caps 94 and 96 of the housing, it should be noted that an intermediate roll bar support 118 (FIG. 16B) is also mounted on the extruded base rail 72 at any desired position. There may also be more than one such intermediate support mounted on the base rail depending upon the length of the roll bar and the amount of sag that might be expected due to the length and weight of the roll bar.

An intermediate support 118 is shown in FIG. 16B to include an arcuate main body 120 having open C-shaped grooves 122 along the top and bottom edges of its concave side for receipt of pivot shafts 124 that have rollers 126 mounted thereon on opposite sides of the main body. The main body has a rearwardly directed, horizontal flange 128 with a downturned lip 130 that is secured to the base rail 72 by passing fasteners 132 through the horizontal flange 128 and into the upwardly opening grooves 76 along the top edge of the extruded base member. The downturned lip 130 from the horizontal flange rests on the upper horizontal shelf 82 of the extruded base member so that the intermediate support 118 member is positively and securely supported on the base rail and in a position to have the rollers 126 engage the roll bar or the canopy when at least partially wrapped around the roll bar to provide support and prevent sagging of the roll bar along its length. If the roll bar is not retained in a straight line, the canopy will sag and collect rain water or the like in an undesirable manner when the canopy is extended. The intermediate support member(s) 118 prevent such sagging of the roll bar and thus any uneven distribution of the canopy.

Referring next to FIGS. 12–15, 16A, and 16B, the construction of the roll bar 38 and its mounting in the housing 36 is illustrated. Referring first to FIGS. 16A and 16B, the roll bar can be seen to include a generally cylindrically shaped tube 134 having a pair of slots 136 formed in its outer surface (FIGS. 5, 6, and 7) which open into inward longitudinally extending protrusions 138 along the length of the cylindrical tube. The outer edge of the canopy 42 is anchored in one of the inward protrusions 138 through an associated slot in the same manner. The inner edge of the canopy is anchored to the side wall 26 of the vehicle with a hem and a retaining rod inserted into the inward protrusion.

The left end of the cylindrical tube as viewed in FIG. 16A has a cylindrical insert 140 frictionally fit therein and held in place with screws 142 passing radially inwardly through the wall of the cylindrical tube and into one of a plurality of notches 144 formed in the insert. The insert has a cylindrical passage therethrough which rotatably receives a bearing member 146 that protrudes completely through the insert and is retained in that position by a washer 148 and C-clamp 150 as possibly best seen in FIG. 12. The bearing frictionally receives an axial press nut 152 in an opening in its outermost end into which a threaded fastener 154 can be received. The threaded fastener 154 passes through a boss in the inner surface of the associated end cap 94 so that the cylindrical tube is allowed to rotate freely about the bearing.

Figure 12:
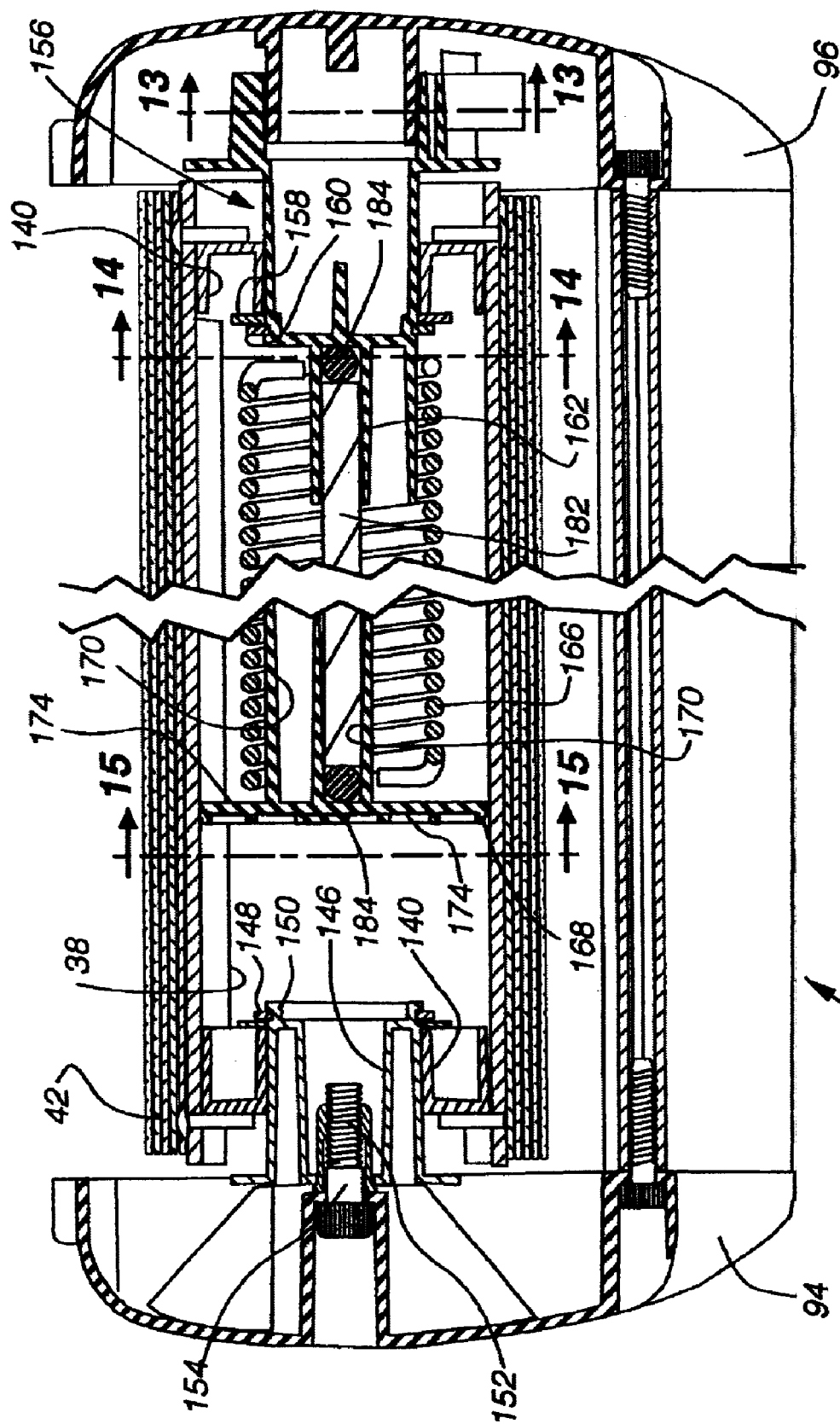
FIG. 12 is an enlarged section with parts removed taken along line 12—12 of FIG. 7.

Referencing FIGS. 12–15 and 16B, the right end of the roll bar can be seen to include an insert 140 identical to the insert at the left end which is again held in place with screws 142 extending radially inwardly through the wall of the cylindrical tube 134 and into a notch 144 in the insert. A spring tensioner 156 is inserted through the circular passage through the insert 140 and is retained in position with a washer 158 and C-clamp 160 as best seen in FIG. 12. The spring tensioner has a generally cylindrical extension 162 extending inwardly from the insert with the generally cylindrical extension having a longitudinally extending notch 164 (FIG. 14) in one surface. A coil spring 166 shown in FIGS. 12 and 16A has its right end seated on the cylindrical extension 162 and a tang at the associated end of the spring 166 is received in the notch 164 to prevent rotation of the spring relative to the spring tensioner.

The opposite end of the coil spring is seated on an anti-rotation device 168 (FIGS. 15 and 16A) having a generally cylindrical shaft 170 with a notch 172 formed therein so that the tang at the associated end of the spring 166 can be received in the notch to prevent the spring from rotating relative to the anti-rotation device. The anti-rotation device also has diametrically projecting tabs 174 defining an overall diameter of the device slightly smaller than the interior diameter of the cylindrical tube 134, but large enough so that the tabs engage the inward protrusions 138 in the tube which thereby prevent the anti-rotation device from rotating relative to the tube. Accordingly, it will be appreciated that the innermost end of the spring, having the anti-rotation device thereon, is fixed relative to the tube for rotation therewith whereas the opposite or outer end of the spring, which is anchored to the tensioner 156, is allowed to rotate relative to the tube. The tensioner as best seen in FIG. 13 has four arcuately tapered teeth 176 around its outer periphery which are adapted to engage a pawl 178 pivotally mounted on a stub shaft 180 (FIG. 13) projecting inwardly from the associated end cap 96 at the right end of the roll bar. The roll bar can be rotated in a clockwise direction as viewed in FIG. 13 which allows the spring 166 to be tensioned and the pawl holds the tensioner in any one of four selected positions as the cylindrical tube is rotated with the tensioner. This system is used to pre-tension the roll bar depending upon the size of the canopy 42 and its extension from the side of the recreational vehicle. In other words, the tension in the roll bar which biases the roll bar toward the retracted position of the cover can be selected so that the ideal amount of bias is placed on the roll bar to allow the canopy to desirably wrap about the cylindrical roll bar as the cover is moved from the extended to the retracted position.

The coil spring 166 is supported along its length by a support rod 182 (FIGS. 12 and 16), which is seated within the tensioner 156 at one end and the anti-rotation device 168 at the other end. A ball bearing 184 is positioned at each end of the support rod so as not to inhibit free rotation of the spring.

It will be appreciated from the above that a cover 24 for a slide-out unit 22 in a recreational vehicle, 20 travel trailer or the like has been described which includes a housing 36 around the roll bar 38 for the canopy wherein the housing has a removable closure panel 100 so that easy access to the interior of the housing and its connection to the roll bar and support system 30 are obtained. Further, opening of the housing permits debris to be removed from the housing which may have accumulated during a retraction of the cover. The cover is also easily mountable on the recreational vehicle on relatively short mounting brackets 46 for improved aesthetics and cost savings and the roll bar itself can be made of a length which is considerably longer than the width of the slide-out unit inasmuch as the support brackets 60 for the roll bar housing can be positioned at any location along the length of the housing.

Although the present invention has been described with a certain degree of particularity, it is understood the disclosure has been made by way of example, and changes in detail or structure may be made without departing from the spirit of the invention as defined in the appended claims.

What is claimed is:

1. The combination of a retractable covering and a structure having a fixed wall and a movable wall comprising: a canopy having first and second opposite parallel edges, an anchor rail secured to said fixed wall and secured to said first edge, a roll bar about which said canopy can be wrapped secured to said movable wall and to said second edge, drive means for moving said covering between extended and retracted positions, said anchor rail and roll bar being adjacent to each other in said retracted position and separated from each other in said extended position with said canopy extended between said anchor rail and said roll bar, a support system interconnecting said fixed wall and roll bar, and an elongated housing for said roll bar including an elongated mounting rail extending along its length, a plurality of support brackets mounted on said movable wall and connected to said mounting rail at spaced locations for supporting said roll bar on said movable wall.

2. The combination of claim 1 wherein said mounting rail includes a continuous mounting strip along its length to which said support brackets can be secured at any location.

3. The combination of claim 2 wherein said mounting strip is a groove into which fasteners can be grippingly inserted to connect a support bracket to the mounting bar.

4. The combination of claim 1 wherein said movable wall has a width and the length of said roll bar is greater than said width.

5. The combination of claim 1 wherein there are more than two of said support brackets.

* * * * *

UNITED STATES PATENT AND TRADEMARK OFFICE
CERTIFICATE OF CORRECTION

| | | |
|---|---|---|
| PATENT NO. | : 7,188,889 B2 | Page 1 of 1 |
| APPLICATION NO. | : 10/993038 | |
| DATED | : March 13, 2007 | |
| INVENTOR(S) | : Robert Wagner and Scott W. Thompson | |

It is certified that error appears in the above-identified patent and that said Letters Patent is hereby corrected as shown below:

On the cover page, item (73) Assignee, delete "Garefree/Scott Fetzer Company" and insert --Carefree/Scott Fetzer Company--.

Signed and Sealed this

Twenty-ninth Day of May, 2007

JON W. DUDAS
*Director of the United States Patent and Trademark Office*

UNITED STATES PATENT AND TRADEMARK OFFICE
Certificate

Patent No. 7,188,889 B2                                                               Patented: March 13, 2007

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Robert Wagner, Longmont, CO (US); and Scott P. Thompson, Boulder, CO (US).

Signed and Sealed this Twenty-ninth Day of December 2009.

D. GLENN DAYOAN
*Supervisory Patent Examiner*
Art Unit 3612